United States Patent [19]

Hand

[11] Patent Number: 5,667,154

[45] Date of Patent: Sep. 16, 1997

[54] CAST ABRASION RESISTANT HOLLOW BALLS

[75] Inventor: Bryan Hand, Norton, Ohio

[73] Assignee: The Babcock & Wilcox Company, New Orleans, La.

[21] Appl. No.: 683,010

[22] Filed: Jul. 16, 1996

[51] Int. Cl.⁶ .................................................. B02C 17/20
[52] U.S. Cl. .......................... 241/184; 164/398; 164/137; 164/98
[58] Field of Search ................................ 164/398, 340, 164/137, 98; 451/330; 241/184, 172; 384/491, 492, 907.1, 912; 428/11, 457; 29/899.1, 899, 895.32, 527.6; 492/53

[56] References Cited

U.S. PATENT DOCUMENTS

| | | | |
|---|---|---|---|
| 1,459,464 | 6/1923 | Bradley | 164/398 |
| 1,823,351 | 9/1931 | Clements | 241/184 |
| 1,934,239 | 11/1933 | Schupp | 29/527.6 |
| 2,378,399 | 6/1945 | Fruth | 451/330 |
| 3,034,735 | 5/1962 | Cadwell | 241/184 |
| 3,254,849 | 6/1966 | Clements | 241/184 |
| 3,491,423 | 1/1970 | Haller | 384/492 X |
| 4,410,285 | 10/1983 | Strasser et al. | 384/907.1 X |
| 4,495,684 | 1/1985 | Sander et al. | |
| 5,295,530 | 3/1994 | O'Connor et al. | 164/137 X |

FOREIGN PATENT DOCUMENTS

| | | | |
|---|---|---|---|
| 3345204 | 6/1985 | Germany | 164/398 |
| 1820 | 1/1980 | Japan | 241/184 |
| 178662 | 11/1982 | Japan | 451/330 |
| 405-079513 | 3/1993 | Japan | 384/492 |
| 253512 | 10/1993 | Japan | 241/184 |
| 1517093 | 7/1978 | United Kingdom | 451/330 |
| 2214992 | 9/1989 | United Kingdom | 384/492 |

*Primary Examiner*—Mark Rosenbaum
*Attorney, Agent, or Firm*—Daniel S. Kalka; Robert J. Edwards

[57] ABSTRACT

A cast abrasion resistant hollow ball is formed with a hollow ceramic core that generates no gas during the casting operation. Solid ceramic bars or supports hold the hollow ceramic core in a fixed location at the center of the cast ball during the casting process. There are no open holes or openings in the ceramic supports due to the fact that the hollow ceramic sphere is composed of an inert refractory material which eliminates any gases being generated during the pouring and solidification of the liquid metal in the casting process.

4 Claims, 1 Drawing Sheet

CAST ABRASION RESISTANT HOLLOW BALLS

BACKGROUND OF THE INVENTION

1. Field of the Invention

The present invention relates in general to cast abrasion resistant hollow balls and more particularly to a hollow pulverizer ball formed on a hollow ceramic core.

2. Description of the Related Art

Hollow metallic balls for pulverizer use have been known where a core hole has been provided in the wall of the ball to discharge any gases evolved in the casting process. Ordinarily, the opening or core hole in the wall of the cast ball has generally been closed by means of a plug or the like.

U.S. Pat. No. 3,254,849 relates to a cast hollow ball which utilizes a core that is consumed in the metal casting process. Gases evolved during the solidification of the metal within the mold escape from the interior of the ball through the openings in the arms or radial pipe-like spokes. This patent teaches that the spokes or arms are advantageously hollow with both ends open so that the gases evolved during solidification of the metal will discharge through the hollow arms of the spider.

It is well known that pulverizer balls must be hollow to allow for the dissipation of compressive forces internally which prevent excessive breakage and service.

Still there exists a need for a process which solves problems associated with the prior art processes. These problems include the core moving due to ferrostatic forces acting thereon. Also, there is a problem with the possibility of fractures initiating at the supports that cause premature failure of the ball with the prior art process. There is need for a process that eliminates the formation of gases in the interior of the casing which can impact the casting integrity and causing premature failure. Also there is a need for a process that eliminates the possibility of metal penetrating the center core material which can contribute to out of balance condition which eventually also leads to premature failure. Thus, there is a need for a new process for making cast abrasion resistant hollow balls and also a need for a cast abrasion resistant hollow ball which has a longer life than the prior art cast hollow balls.

SUMMARY OF THE INVENTION

The present invention is directed to solving the aforementioned problems associated with the prior art as well as others by providing a cast hollow ball which is cast on a spherical hollow ceramic core made from a highly refractory material such as fused silica ($SiO_2$) or other high temperature materials such as fused quartz or calcined alumina ($Al_2O_3$).

The method of the present invention employs a hollow ceramic core which is placed into a mold cavity such as a sand mold cavity and has liquid metal poured around the core. The metal is allowed to solidify. The ceramic hollow core is supported by either a singular or plurality of solid ceramic bars or supports to hold it in a fixed location in the center of the cast ball. If a plurality of bars are used, these would be located in a planer orientation and would support the hollow ceramic sphere on location and resist ferrostatic forces acting on the same. If a single ceramic support is employed, this would be oriented in a vertical plane and have attaching means on one end to attach to the ceramic core to the support.

The method of the present invention advantageously uses a ceramic hollow core which is fired at a temperature in excess of 1500° F. to eliminate any trace of organic materials to complete the bonding process or a blown fused quartz hollow sphere with internal support members or arms. The blown fused quartz would not require a high temperature firing cycle. Also, the method of the present invention generates no gas when surrounded by the liquid metal during the solidification process. As such, the ceramic supports are solid and have no open holes in the ceramic support since the present invention is not concerned with venting any gas since little or no gas is generated. There are no open holes in the ceramic supports due to the fact that the hollow ceramic sphere is composed of an inert refractory material which eliminates any gases being generated during the pouring and solidification process.

Accordingly, one object of the present invention is to provide an improved cast hollow ball which is abrasion resistant.

Another object of the present invention is to provide a method for making a cast abrasion resistant hollow ball.

Still a further object of the present invention is to provide a cast abrasion resistant hollow ball which is simple in design, rugged in construction and economical to manufacture.

The various features of novelty characterizing the invention are pointed out in particularity in the claims annexed to and forming a part of this disclosure. For a better understanding of the invention, the operating advantages attained by its uses, reference is made to the accompanying drawings and descriptive matter in which a preferred embodiment of the invention is illustrated.

DESCRIPTION OF THE PREFERRED EMBODIMENTS

Figure 1:
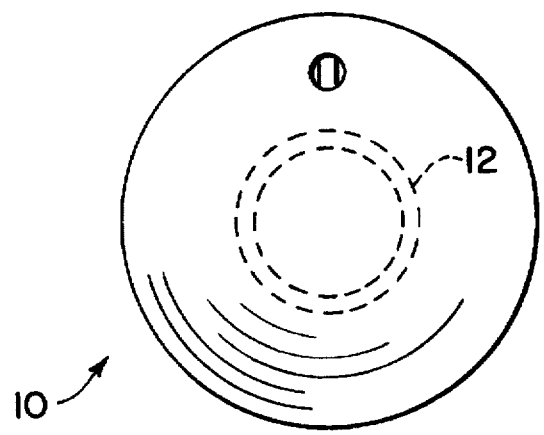
FIG. 1 is an exterior view of a hollow ball cast in accordance with the present invention.

Hollow metal balls have been successfully used in the operation of a pulverizer of the general type shown in U.S. Pat. No. 2,275,595. In the present invention, one such use for the cast hollow balls is a similar use for these types of pulverizers. The ball has an exterior diameter of approximately 12¼ inch with a wall thickness of approximately 3½ inch thick. Other hollow balls of varying exterior diameters may be made with the method of the present invention ranging from 6½ inch or smaller to 40¼ inch with metal wall thicknesses ranging from 1¼ inch to 10 inch thick. Of course, larger or smaller diameter balls having a greater or lesser thickness may also be cast with the method of the present invention. These balls are cast from highly abrasion resistant ferrous metals such as ASTM A532M-93A Class I through III or A128M93 grades "A" through "F" and/or other suitable materials. These may be heat treated to obtain desired physical and metallurgical characteristics. The size of the ball being determined by the use to which they are adapted and the balls may be used in other types of pulverizers or applications. Experience has shown that hollow balls as described herein when heat treated for service in a pulverizer resist impact stresses and heat effects better than solid balls formed from the same material and similarly heat treated.

In manufacturing the hollow ball (10) shown in the figures, a hollow ceramic core (12) is made from a highly refractory material such as fused silica for example or other high temperature ceramic materials. The ceramic core (12) is fired at temperatures in excess of 1500° F. or a temperature high enough to eliminate any trace of organic material in the ceramic core (12). Advantageously, the present invention uses a ceramic hollow cast or blown core as opposed to the core material disclosed in U.S. Pat. No. 3,254,849 which is a consumable core material and generates gases during the metal casting process. The present invention employs the hollow ceramic cast or blown core (12) which when fired prior to the casting process eliminates any trace of organic material and results in a core (12) which generates no gas when surrounded by the liquid metal during the solidification of the metal and the casting process.

U.S. Pat. No. 3,254,849 is hereby incorporated by reference. Unlike the casting process as disclosed in that patent, the present invention does not employ the consumable core material nor does it employ hollow arms 11 as disclosed in that patent. Rather, the present invention advantageously produces an improved cast hollow ball which may be employed as a pulverizer ball as described in that patent, but the core material (12) in the instant invention is a ceramic cast or blown spherical hollow core (12) which uses at least one refractory bar or support (14) which is solid. There are no openings or holes in the ceramic support (14) due to the fact that the hollow ceramic sphere core (12) is composed of an inert refractory material which eliminates any gases being generated during the pouring and solidification of the liquid metal during the casting process.

Figure 2:
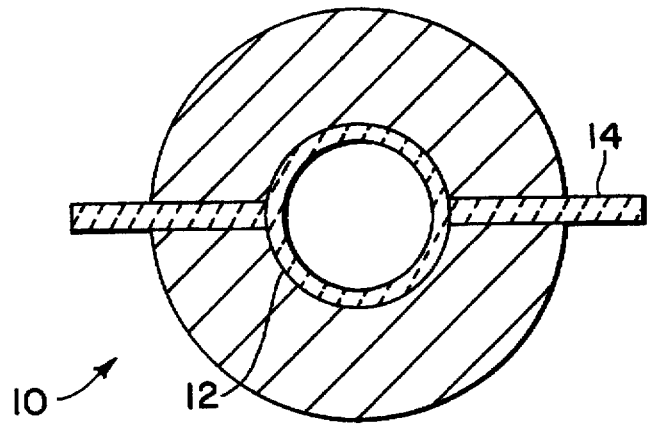
FIG. 2 is a sectional view of a hollow ball cast with two planer supports after the hollow ball has been cast but prior to the removal of the excess refractory supports.
Figure 3:
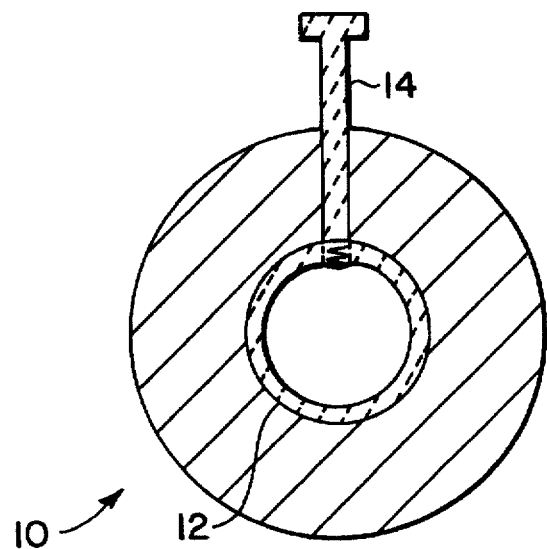
FIG. 3 is a cross section view of a hollow ball cast with a single vertical refractory bar which is threadably engaged into the hollow refractory sphere or core.

FIG. 2 discloses a core (12) with two ceramic or refractory supports fastened to the core and which hold the core (12) in a fixed location at the center during the casting process. In this manner, the core (12) is at the center of the cast pulverizer ball (10). It will be understood that a greater or lesser number of refractory supports (14) can be used in the same plane or otherwise if necessary to support the core (12) so that it remains in the center of the ball (10) during the casting operation. The present invention provides for at least one ceramic or refractory support (14) as shown in FIG. 3 which is fastened such as by threadably engaging the ceramic core (12) or fixed thereto. When a single ceramic support (14) is employed it is preferably oriented in a vertical plane to hold the ceramic core (12) in the fixed location in the center of a cast ball.

The hollow ceramic core or sphere (12) is placed or held in a molding cavity such as a sand mold cavity and liquid metal is poured or drawn with or without the use of a vacuum and is allowed to solidify around the ceramic core in a casting operation as described in U.S. Pat. No. 3,254,849 or any other suitable casting operation. After pulverizer ball (10) is formed and solidified, the excess ceramic support (14) is removed and the pulverizer ball is made flush and now may be heat treated or baked to obtain desired physical and metallurgical characteristics.

While a specific embodiment of the present invention has been shown and described in detail to illustrate the application and principles of the present invention, it will be understood that the invention may be embodied otherwise without departing from such principles.

I claim:

1. An article of manufacture, comprising:

a metallic hollow cast ball having a hollow ceramic core situated therein, said hollow cast ball having at least one solid ceramic support situated therein extending outwardly from the hollow ceramic core to an exterior surface of said hollow cast ball.

2. An article of manufacture as set forth in claim 1, wherein said metallic hollow cast ball comprises a pulverizer ball.

3. An article of manufacture as set forth in claim 1, wherein said at least one ceramic support comprises two solid ceramic supports situated diametrically opposite each other in a planar orientation.

4. An article of manufacture as set forth in claim 1, wherein said at least one ceramic support comprises a plurality of ceramic supports.

* * * * *